(12) United States Patent
Malik et al.

(10) Patent No.: US 7,755,800 B2
(45) Date of Patent: Jul. 13, 2010

(54) ESTIMATING AN AMOUNT OF COLOR CONTENT IN A DOCUMENT

(75) Inventors: Amal Z. Malik, Webster, NY (US); Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 281 days.

(21) Appl. No.: 12/025,991

(22) Filed: Feb. 5, 2008

(65) Prior Publication Data

US 2009/0195800 A1   Aug. 6, 2009

(51) Int. Cl.
*G06F 15/00*   (2006.01)
*H04N 1/46*   (2006.01)

(52) U.S. Cl. .................. 358/1.9; 358/538; 358/539; 705/34

(58) Field of Classification Search .................. 358/1.9, 358/538, 539, 540, 1.1, 3.23, 1.13, 453, 462, 358/465; 355/112; 705/34, 62
See application file for complete search history.

(56) References Cited

U.S. PATENT DOCUMENTS

| | | | | |
|---|---|---|---|---|
| 4,890,165 A | * | 12/1989 | Hasegawa | 348/312 |
| 6,064,838 A | * | 5/2000 | Maruta et al. | 399/79 |
| 6,157,469 A | | 12/2000 | Mestha | |
| 6,240,205 B1 | * | 5/2001 | Fan et al. | 382/173 |
| 6,377,304 B1 | * | 4/2002 | Saitoh | 348/308 |
| 6,493,019 B1 | * | 12/2002 | Hirasawa | 347/233 |
| 6,516,157 B1 | * | 2/2003 | Maruta et al. | 399/8 |
| 6,519,571 B1 | * | 2/2003 | Guheen et al. | 705/14.66 |
| 6,580,525 B1 | * | 6/2003 | Iwakiri et al. | 358/471 |
| 6,757,424 B2 | * | 6/2004 | Love | 382/154 |
| 2002/0032027 A1 | * | 3/2002 | Kirani et al. | 455/426 |
| 2003/0140315 A1 | * | 7/2003 | Blumberg et al. | 715/527 |
| 2005/0174591 A1 | * | 8/2005 | Sowinski et al. | 358/1.9 |
| 2008/0079967 A1 | * | 4/2008 | He | 358/1.9 |
| 2009/0109454 A1 | * | 4/2009 | Nagarajan et al. | 358/1.9 |
| 2009/0195799 A1 | | 8/2009 | Malik et al. | |
| 2009/0195801 A1 | | 8/2009 | Malik et al. | |

OTHER PUBLICATIONS

Kartheek Chandu and Eli Saber and Wencheng Wu, A Mutual Information Based Automatic Registration and Analysis Algorithm For Defect Identification in Printed Documents, Image Processing 2007-ICIP 2007-IEEE International Conference, Oct. 17, 2007, Rochester Institute of Technology, Rochester, New York.

* cited by examiner

*Primary Examiner*—Madeleine A Nguyen
(74) *Attorney, Agent, or Firm*—Philip E. Blair; Fleit Gibbons Gutman Bongini & Bianco P.L.

(57) ABSTRACT

What is provided herein is a novel system and method for estimating the amount of color in a document to be printed, with the capability to handle composite black, in those environments without access to all the original four color planes simultaneously. In one embodiment, input CMYK values are pre-adjusted via a look-up table to take into account the neutral balance characteristics. The planes are then scaled and quantized so that all four planes become available simultaneously. The difference among the quantized CMYK color values is compared against a threshold that is input level dependent. A pixel is classified into one of several color categories such as, for example, true neutral, fuzzy neutral, true color or fuzzy color. A color billing strategy can then be automatically determined based on the amount of color content. The method advantageously provides flexibility to support multi-tier billing in systems with various marking technologies.

9 Claims, 3 Drawing Sheets

ESTIMATING AN AMOUNT OF COLOR CONTENT IN A DOCUMENT

TECHNICAL FIELD

The present invention is directed to system and methods for estimating the amount of color in a document to be printed.

BACKGROUND

In dynamic print-job environments which process color print jobs for customers, billing is often based on the amount of color content contained in the job to be printed. In order to bill customers for color printing, color detection is a very important feature required in the image path. Color detection is used to analyze print documents for presence as well as amount of color in order to bill customers accordingly.

Some systems rely on user input settings for billing information. This can cause incorrect billing especially in the case of a multi-page document having color on some of the pages but not on others. In these case, the print-job operator would have to physically scan every page of the entire multi-page document in order to properly take into account all the color content contain in the document. This can be time consuming and expensive. This is especially problematic in dynamic print-job environments where print-job processing time and throughput must be maximized in order to maintain profitability.

In some instances, if a large multi-page document contains any color at all, the customer is charged for the whole document as being a color. This can be problematic for the customer if their large multi-page document really only contains very little color content and the price differential between a black/white print-job differs substantially from the price of a color print-job.

Also, billing has traditionally been only a 2-tier billing model. In other words, as long as any single color pixel (C, M, or Y) is turned on, the entire page is billed at the higher rate for reproducing a page of color content. With the need to go with multi-tier color billing, there is a need in this art to examine all 4 color planes (CMYK) quickly and efficiently.

However, all four color planes may not always be synchronized when the image path hardware examines the color content of the document because the pixels from each of the different color planes may not be looked at simultaneously. Depending on the kind, amount, and type of image content contained in a particular color page, the results can vary significantly if inefficient metrics such as the number of color pixels or percentage coverage of color is used instead.

Accordingly, what is needed in this art are increasingly sophisticated applications and advanced methodologies for color management systems which correctly estimate the amount of color content in a multi-page document when all four color planes (CMYK) are not available simultaneously, i.e., there is an offset between the planes while being printed.

BRIEF SUMMARY

What is provided are a novel system, method, and computer program product for estimating the amount of color in a document to be printed, with the capability to handle composite black, in those environments without access to all the original four color planes simultaneously. A color billing strategy can then be implemented based on the estimated amount of color.

In one example embodiment, a document for which a billing strategy is to be determined is received. The document contains image content. The image content is scanned to determine whether any color content is present in the image contained within the received document. If no color is present then a billing strategy can be implemented for that document based upon black/white. Otherwise, if color is determined to be present, the following are performed. The gray level range for the color planes and black plane are subdivided into a plurality of regions. The color planes are subdivided into $2^n$ regions. The black plane is subdivided into $2^m$ regions. Color pixels are assigned values from 0 to $2^n-1$, on a pixel-by-pixel basis, based upon the range into which that pixel falls. Black pixels are assigned values from 0 to $2^m-1$, on a pixel-by-pixel basis, based upon the range into which that pixel falls. Each pixel is then examined to determine the color value of that pixel. The number of pixels are counted to obtain a total accumulated pixel count for each color. A color billing strategy is then implemented based upon the obtained total accumulated pixel counts.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a method for estimating the amount of color in a document to be printed, with the capability to handle composite black, in those environments without access to all the original four color planes simultaneously. A color billing strategy can then be implemented based on the estimated amount of color.

It should be understood that one of ordinary skill in this art would be readily familiar with many facets of color science such as, but not limited to, color space, color image scaling, color transformation, and other related techniques commonly found in the color science arts. Additionally, one of ordinary skill in this art would also be familiar with advanced mathematical techniques for color manipulation and color transformation. One of ordinary skill in this art would also be knowledgeable about computer science and software and programming systems and methods sufficient to implement the functionality and capabilities described in detail herein in their own hardware environments without undue experimentation.

Figure 1:
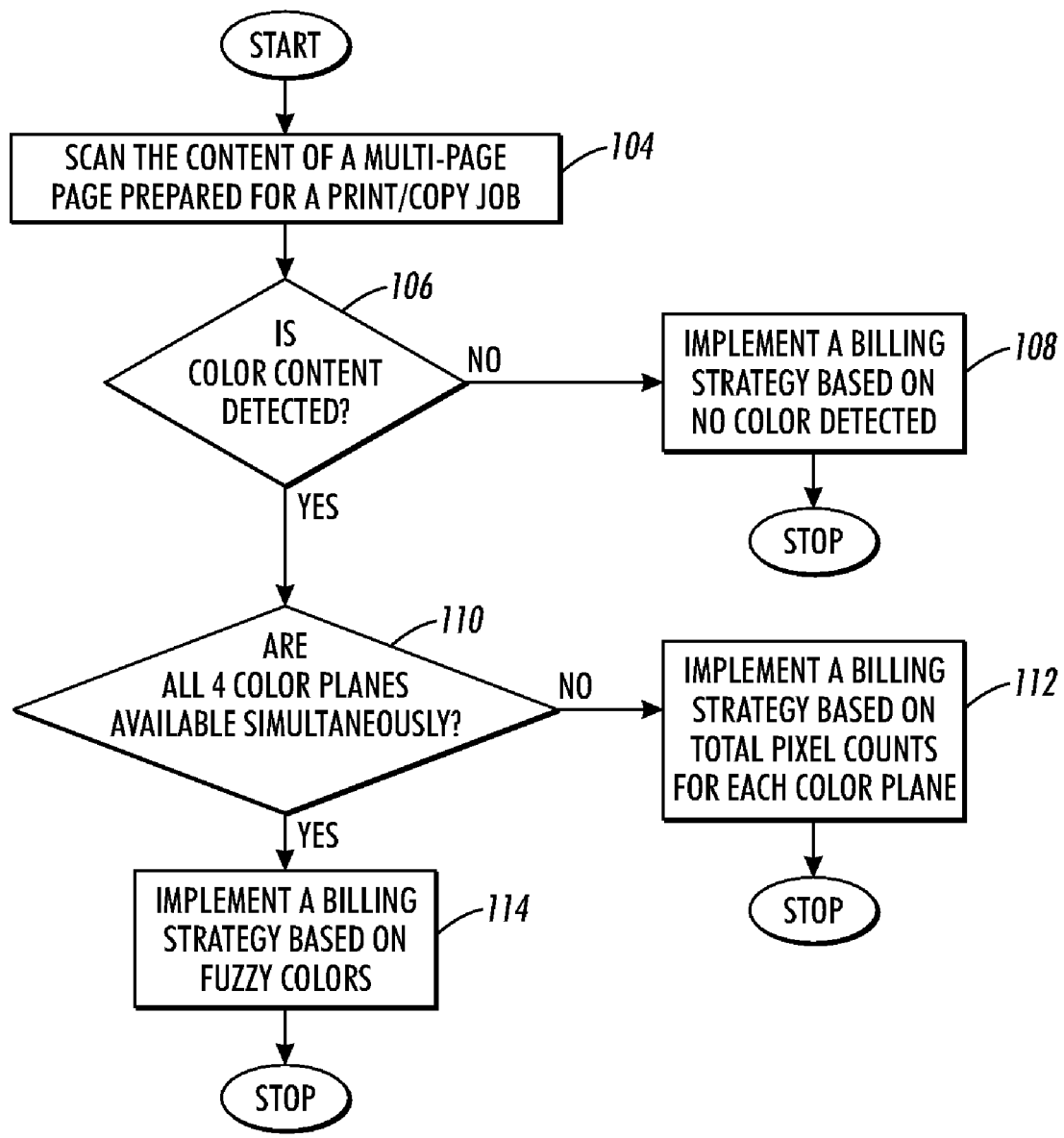
FIG. 1 illustrates a flow diagram of one embodiment of the present method for determining a billing strategy based on document content.

Reference is now being made to FIG. 1 which illustrates a flow diagram of one embodiment of the present method for determining a billing strategy based on document content.

At step 104, a document is received for a print/copy job for which a billing strategy is to be determined based on the amount of color content contained in the document. At step 106, a determination is made whether the document contains any color content at all. If no color content is detected then, at step 108, a billing strategy is implemented based on no color content in the document having been detected. The print/copy job would thus be billed at one rate. If color content is detected in the document then, at step 110, a further determination is made whether all four color planes can be accessed simultaneously, i.e., if there is an offset between the four planes. If all four color can be accessed simultaneously then, at step 112, a billing strategy for the document is implemented based on a total pixel counts for each color detected. Otherwise, at step 114, a billing strategy is implemented based on fuzzy colors.

Figure 2:
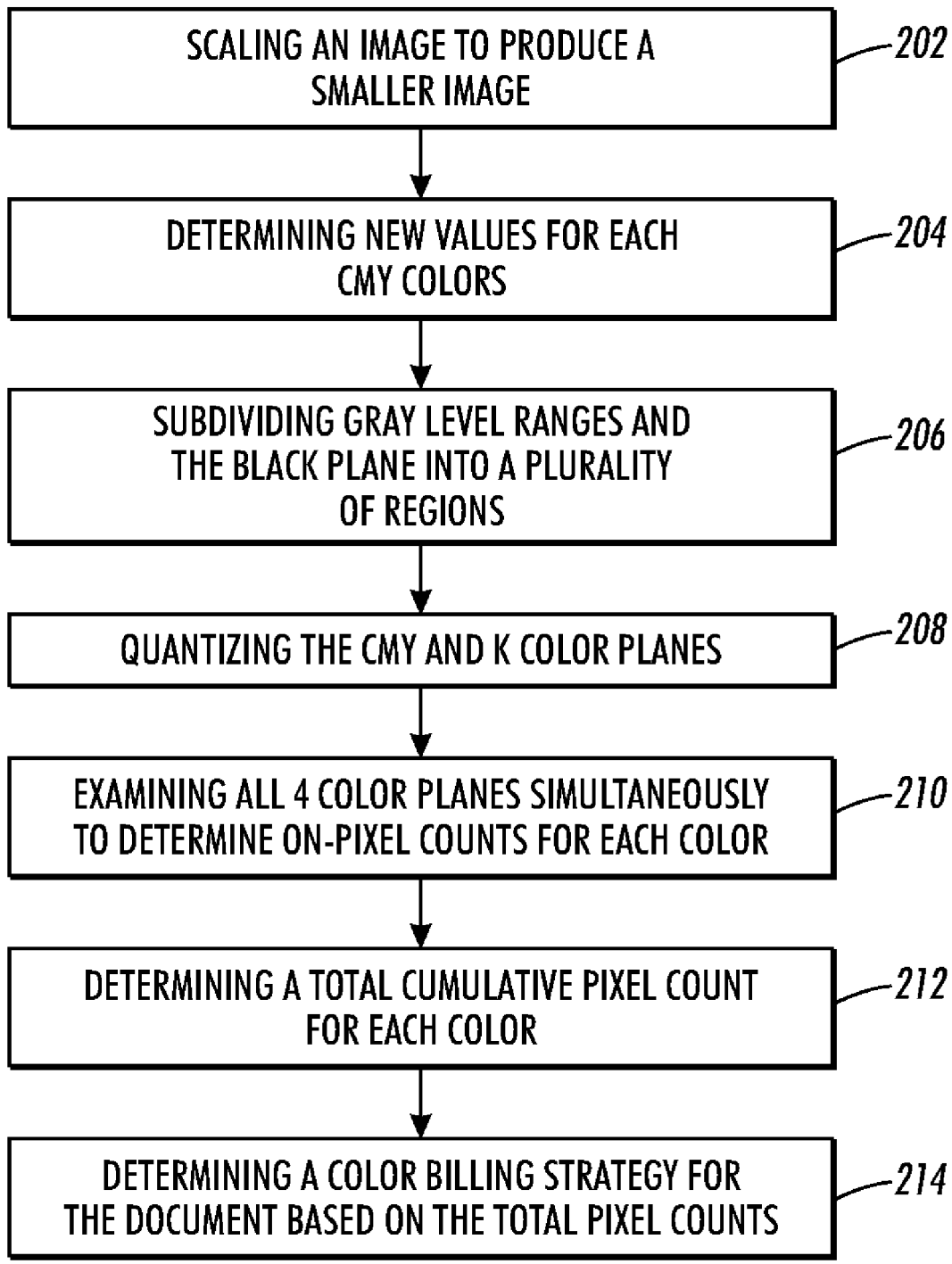
FIG. 2 illustrates a flow diagram of one embodiment of the present method for estimating the amount of color content in a document.

Reference is now being made to FIG. 2 which illustrates a flow diagram of one embodiment of the present method for estimating the amount of color content in a document. By way of example, the present method involves the following.

At step 202, the image under examination is scaled to produce a smaller image using scaling techniques found in the arts. Techniques for scaling images are, for example, "nearest neighbor" and "averaging". One skilled in this art would be familiar with image scaling. In the example embodiment, the image is scaled by a factor of 1/M in the fast scan direction and by a factor of 1/N in the slow scan direction.

At step 204, new values for each of the CMY colors are determined as follows.

If (C_HIGH is on) then C1=C-LUTC[C] else C1=C.
If (M_HIGH is on) then M1=M-LUTM[M] else M1=M.
If (Y_HIGH is on) then Y1=Y-LUTY[Y] else Y1=Y, where LUTC, LUTC, LUTY are arrays of 256 entries holding positive or negative respective offset values less than 256, usually close to 0. It should be understood that C_HIGH, Y_HIGH, M_HIGH are flags indicating that the C, M, or Y pixels are to be adjusted via the LUTC[ ], LUTM[ ], LUTY[ ] tables respectively, depending on whichever of these flags is ON.

At step 206, gray level range and the black plane are subdivided into a plurality of regions. In this example, the gray level range, (i.e., 0 to 255), is subdivided into $2^n$ ranges: [0, WHITE_TH], [RNG0+1, RNG1], [RNG1+1, RNG2], . . . [BLACK_TH+1, 255]. For converting an 8-bit pixel plane to an n-bit pixel plane, where n=3, the ranges are: [0, WHITE_TH], [WHITE_TH+1, RNG0], [RNG0+1, RNG1], [RNG1+1, RNG2], [RANG2+1, RNGE3], [RNG3+1, RNG4], [RNG4+1, RNG5], [RNG5+1, RNG6], where RNG6≦255 and RNG5=BLACK_TH. The ranges can be adjusted to meet a particular need by manipulating the values of RNG0, RNG1, etc. and/or by changing the black/white threshold values for BLACK_TH and WHITE_TH.

The black (K) plane is subdivided into $2^m$ ranges. For m=2: [0, WHITE_TH_K], [WHITE_TH_K+1, MED_K], [MED_K+1, HIGH_K], [HIGH_K+1, VHIGH_K], where VHIGH_K≦255.

At step 208, the CMY color planes are quantized by assigning values from 0 to $2^n-1$ for each CMY color plane on a pixel by pixel basis wherein an 8-bit pixel is assigned a number from 0 to 7 (for n=3) based on the range into which the 8-bit pixel falls. The quantization process of the color planes reduces the 8 bpp (bits per pixel) data to n-bits where n is smaller than 8, (e.g. 2 or 3), and does not have to be the same for all four color planes. In this example, the image is quantized from 8 bpp to 3 bpp. The Black (K) plane is quantized by assigning values from 0 to $2^m-1$ (for m=2, $2^m-1$ equals 3) to the 8 bpp plane based on the range into which the 8-bit pixels falls. In this example, the image is quantized from 8 bpp to 3 bpp for CMY planes, and from 8 bpp to 2 bpp for K plane.

At step 210, all four scaled and quantized color planes are examined simultaneously to determine on-pixel counts for each color. In this example, the pixels are examined for any of: color, black, white, and gray. It should be understood that this is extendable to more than 4 color planes.

Each pixel of the scaled and quantized image is examined to determine a color for that pixel. In one embodiment, each pixel is counted as follows:

If ((C=0, M=0, Y=0) AND (K=0)) then the current pixel will be counted as a white pixel.

Else if ((C=0, M=0, Y=0), AND (K>0) AND (K≦GRAY_TH)), where GRAY_TH is a threshold value for gray, then the current pixel will be counted as a gray pixel.

Else if ((C=0, M=0, Y=0) AND (K>GRAY_TH)) then the current pixel will be counted as a black pixel.

Else if ((K==$2^m$-1) AND (K+minCMY≧BLACK_KMIN_TH)) where minCMY is the minimum value for color for the current pixel and where BLACK_KMIN_TH is the programmable minimum threshold value for black, then, if (K≧maxCMY-BLACK_KMAX_TH) where maxCMY is a maximum value for color for current pixel, and BLACK_KMAX_TH is a programmable maximum threshold value for black, then the current pixel will be counted as a black pixel.

Else, if ((maxCMY-minCMY≧$2^m$-1) and (K≧maxCMY-minCMY-BLACK_KMIN_MAX_TH)), where BLACK_KMIN_MAX_TH is a programmable offset value, then the current pixel will be counted as a black pixel. BLACK_MIN_MAX_TH is a programmable value which is just an offset. It can even be 0. A typical value is 10.

Else if ((C≧WHT_THR, M≧WHT_THR, or Y≧WHT_THR) AND (maxCMY-minCMY≧RANGE_DIFF_COLOR)), where WHT_THR is a small threshold value for white, and where RANGE_DIFF_COLOR is the difference between two ranges and is greater than or equal to 2, then the current pixel will be counted as a color pixel.

Else if (maxCMY-minCMY=0) then the current pixel will be counted as a could_be_gray pixel.

Else if (maxCMY-minCMY=RANGE_DIFF_GRAY), where RANGE_DIFF_GRAY is the difference between two ranges and is less than 2, then the current pixel will be counted as a could_be_color pixel). The above three conditions can be changed based on the way the ranges are set in color quantization, i.e. conversion from 8 bpp to 3 bpp (or 2 bpp). For example, the range values (RNG0, RNG1, . . . , RNGn) used to quantize the colors.

At step 212, a total accumulated pixel count is obtained for each color.

At step 214, a color billing strategy can then be implemented based on the total accumulated pixel count for each color. By way of example, a color billing strategy based on the accumulated total pixel counts for each color involves the following.

Let color_th be the percentage threshold of the total window size required for a page to be determined to be a color page. Thus: color_th=(perct_th/100)*total_window_size.

If (color≧color_th) then the billing is based on a color page.

Alternatively, assume that minsumclr=accumulated color. Let maxsumclr=accumulated color+(could_be_color+could_be_gray). Then, If (maxsumclr>color_th) and (minsumclr<color_th), then delta level=(maxsumclr-minsumclr)/q, where q is a desired number of equal-sized different billing level partitions. The amount of color would lie in one of the q levels. The level in which the determined page color lies would be the threshold for color billing.

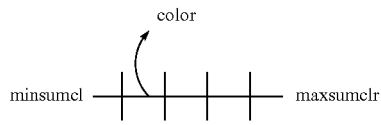

Alternatively, an average or median of minsumclr and maxsumclr could be used to determine a threshold for color billing.

Various other multi-tiered billing strategies are envisioned.

As the specific implementation of the end-user hereof will vary depending on hardware and/or software constraints, program code in a particular programming language has been omitted.

It should be understood that the flow diagrams depicted herein are illustrative. Operations may be added, modified, enhanced, condensed, integrated, or consolidated. Variations thereof are envisioned and are intended to fall within the scope of the appended claims.

Figure 3:
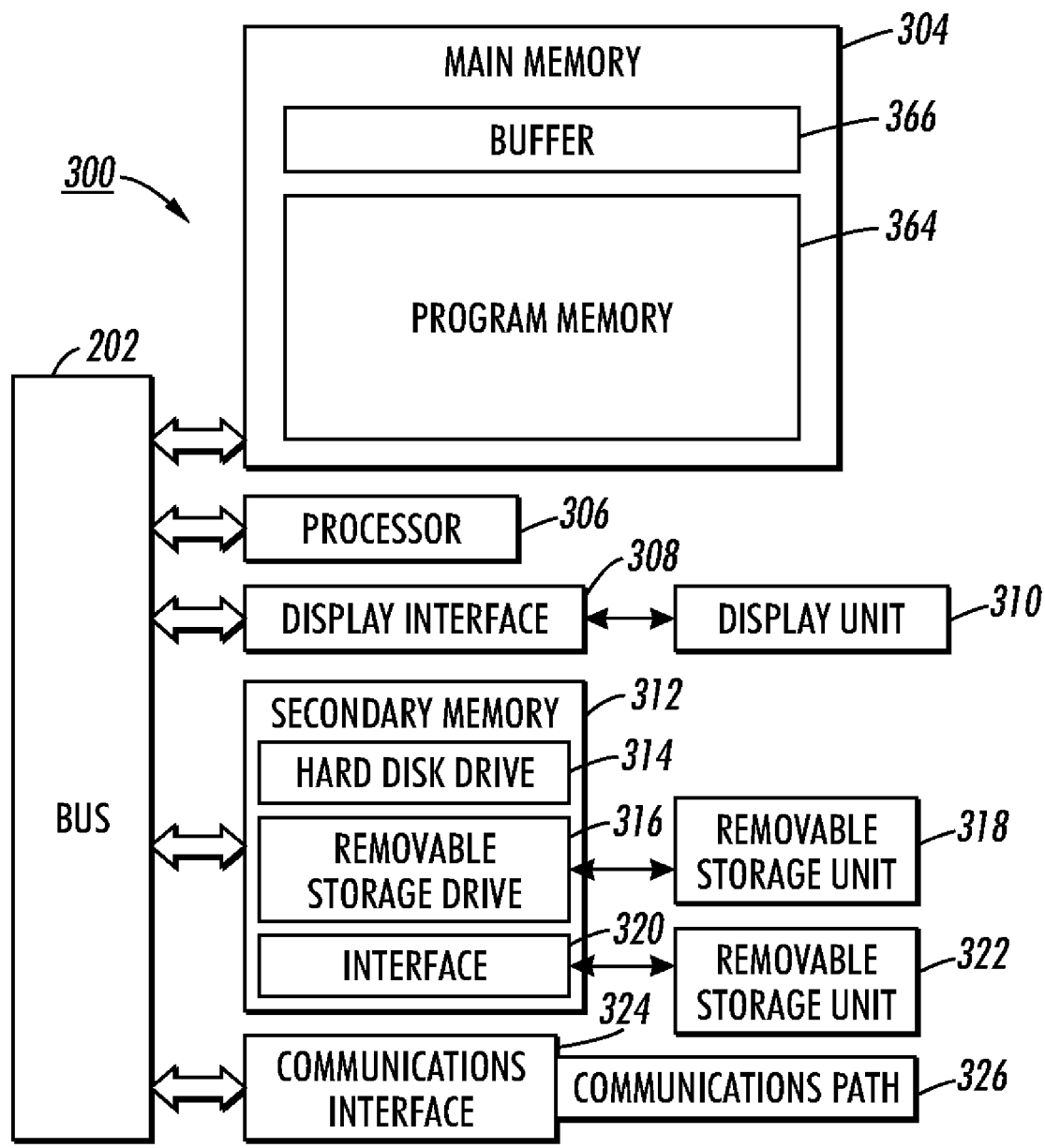
FIG. 3 illustrates a block diagram of one embodiment of a computer system useful for implementing the method illustrated in the flow diagrams of FIGS. 1 and 2.

Reference is now being made to FIG. 3 illustrating a block diagram of one embodiment of a computer system useful for implementing the method illustrated in the flow diagrams of FIGS. 1 and 2.

The computer system 300 can be a xerographic system, a photocopier, or printing device. The computer system includes one or more processors, such as processor 306 capable of executing machine executable program instructions. In the embodiment shown, the processor is in communication with bus 302 (e.g., a backplane interface bus, crossover bar, or data network). The computer system also includes a main memory 304 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 366 to temporarily store data for access by the processor, and a program memory 364 that includes, for example, executable programs that implement the methods described herein. The program memory is capable of storing a subset of the data that is less than all of the data contained in the buffer.

Computer system 300 includes a display interface 308 that forwards data from communication bus 302 (or from a frame buffer not shown) to display 310. The computer system also includes a secondary memory 312. The secondary memory may include, for example, a hard disk drive 314 and/or a removable storage drive 316 which reads and writes to removable storage unit 318, such as a floppy disk, magnetic tape, optical disk, etc., that stores computer software and/or data.

In an alternative embodiment, the secondary memory 312 includes other similar mechanisms for allowing computer programs or other instructions to be loaded into the computer system. Such mechanisms may include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable storage units and interfaces 320 which allow software and data to be transferred from the removable storage unit to the computer system.

The computer system 300 includes a communications interface 324 which acts as both an input and an output to allow software and data to be transferred between the computer system and external devices. Examples of a communications interface include a modem, a network interface (such as an Ethernet card), a communications port, a PCMCIA slot and card, etc. Software and data transferred via the communications interface are in the form of signals which may be, for example, electronic, electromagnetic, optical, or other signals capable of being received by communications interface 324. These signals are provided to communications interface via a communications path 326 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 304 and secondary memory 312, removable storage drive 316, a hard disk installed in hard disk drive 314, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein.

It should be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for estimating the amount of color content in a document to determine a billing strategy for that document, the method comprising:
   receiving a document containing image content;
   scanning said image content to determine whether any color content is present; and
   in response to no color content being present determining a billing strategy based on black/white, otherwise comprising:
   subdividing the gray level range for each color plane and the black plane into a plurality of regions, said color planes being subdivided into $2^n$ regions, and said black plane being subdivided into $2^m$ regions, said amount of subdividing not having to be the same for each plane;
   assigning values from 0 to $2^n-1$ to each color pixel, on a pixel-by-pixel basis, based upon a range of said subdivided color plane into which the pixel falls, said assigning being such that 8-bit color pixels are reduced to n-bits where n is a number less than 8;
   assigning values from 0 to $2^m-1$ to each black pixel, on a pixel-by-pixel basis, based upon a range of said subdivided black plane into which the pixel falls, said assigning being such that 8-bit black pixels are reduced to m-bits where m is a number less than 8;
   examining pixels of said image content to determine the color of each pixel;
   counting the number of pixels to obtain a cumulative total pixel count for each color for said image content; and
   dynamically determining a color billing strategy for said document based on said cumulative total pixel counts.

2. The method of claim 1, wherein said color billing strategy is based on a percentage threshold of a total window size required for said image content to be determined to be color.

3. The method of claim 1, wherein said color billing strategy is based on a multi-tiered threshold value determined by a total color value.

4. A system for estimating the amount of color content in a document to determine a billing strategy for that document, the system comprising:
   a storage medium capable of storing data; and
   a processor in communication with said storage medium, said processor capable of executing a machine readable instruction for performing the method of:
   receiving a document containing image content;
   scanning said image content to determine whether any color content is present; and
   in response to no color content being present determining a billing strategy based on black/white, otherwise comprising:
   subdividing the gray level range for each color plane and the black plane into a plurality of regions, said color planes being subdivided into $2^n$ regions, and said black plane being subdivided into $2^m$ regions, said amount of subdividing not having to be the same for each plane;
   assigning values from 0 to $2^n-1$ to each color pixel, on a pixel-by-pixel basis, based upon a range of said subdivided color plane into which the pixel falls, said assigning being such that 8-bit color pixels are reduced to n-bits where n is a number less than 8;
   assigning values from 0 to $2^m-1$ to each black pixel, on a pixel-by-pixel basis, based upon a range of said subdivided black plane into which the pixel falls, said assigning being such that 8-bit black pixels are reduced to m-bits where m is a number less than 8;
   examining pixels of said image content to determine the color of each pixel;
   counting the number of pixels to obtain a cumulative total pixel count for each color for said image content; and
   dynamically determining a color billing strategy for said document based on said cumulative total pixel counts.

5. The system of claim 4 wherein said color billing strategy is based on a percentage threshold of a total window size required for said image content to be determined to be color.

6. The system of claim 4, wherein said color billing strategy is based on a multi-tiered threshold value determined by a total color value.

7. A computer program product for estimating the amount of color content in a document to determine a billing strategy for that document, the computer program product comprising:
   a computer-usable data carrier storing instructions that, when executed on a computer, cause the computer to perform a method comprising:
   receiving a document containing image content;
   scanning said image content to determine whether any color content is present; and in response to no color content being present determining a billing strategy based on black/white, otherwise comprising:

subdividing the gray level range for each color plane and the black plane into a plurality of regions, said color planes being subdivided into $2^n$ regions, and said black plane being subdivided into $2^m$ regions, said amount of subdividing not having to be the same for each plane;

assigning values from 0 to $2^n-1$ to each color pixel, on a pixel-by-pixel basis, based upon a range of said subdivided color plane into which the pixel falls, said assigning being such that 8-bit color pixels are reduced to n-bits where n is a number less than 8;

assigning values from 0 to $2^m-1$ to each black pixel, on a pixel-by-pixel basis, based upon a range of said subdivided black plane into which the pixel falls, said assigning being such that 8-bit black pixels are reduced to m-bits where m is a number less than 8;

examining pixels of said image content to determine the color of each pixel;

counting the number of pixels to obtain a cumulative total pixel count for each color for said image content; and dynamically determining a color billing strategy for said document based on said cumulative total pixel counts.

8. The computer program product of claim 7, wherein said color billing strategy is based on a percentage threshold of a total window size required for said image content to be determined to be color.

9. The computer program product of claim 7, wherein said color billing strategy is based on a multi-tiered threshold value determined by a total color value.

* * * * *